Aug. 29, 1967   C. TYGENHOF   3,338,457

AUTOMOBILE RADIATOR CAP

Filed Dec. 23, 1965

INVENTOR.
CHARLES TYGENHOF
BY John Cyril Malloy

ATTORNEY.

3,338,457
AUTOMOBILE RADIATOR CAP
Charles Tygenhof, 2750 NE. 208th Terrace,
North Miami Beach, Fla. 33160
Filed Dec. 23, 1965, Ser. No. 515,850
7 Claims. (Cl. 220—44)

This invention relates to automobile radiator caps and, more particularly, to an improved automobile radiator cap and to means included in the cap for providing a liquid level signaling device.

It is quite often necessary to check the water level in the radiator of an automobile. Sometimes the water in the radiator is quite hot and under high pressure. Quite often injuries occur when this pressure is released suddenly and causes water to be sprayed outwardly by the pressure as it is released. This invention provides a radiator cap which, when installed on an automobile radiator, will indicate whether or not there is a sufficient liquid level within the automobile radiator housing without the necessity of removing the cap and, in the event that the radiator does not have sufficient water in the housing, a release valve so that the pressure within the radiator may be relieved without removal of the cap.

It is, accordingly, an object of this invention to provide a radiator cap for an automobile radiator housing having a central axial plastic probe which is visible exteriorly when on the radiator so that if the end area of the probe is immersed in water this may be determined without actually removing the radiator cap.

It is another object of this invention to provide a liquid level signaling device for an automobile radiator cap which includes, in addition, a release valve so that pressure in the radiator may be relieved by manipulating a test probe carried in the cap which also serves as a liquid level signaling member.

It is another object of this invention to provide an improved automobile radiator cap including a liquid level signaling device which is composed of relatively inexpensive parts and assembled so as to be durable and well adapted for the purposes for which it is intended.

In accordance with these and other objects which will become apparent hereinafter, the instant invention will now be described with reference to the accompanying drawings in which.

Figure 1:
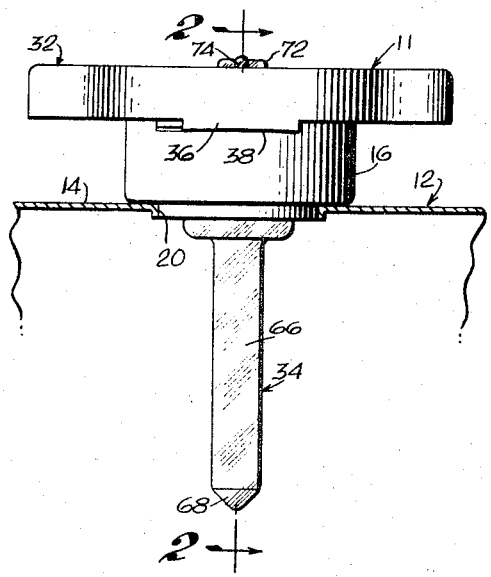
FIGURE 1 is a side elevation view of the improved radiator cap mounted to a radiator housing, shown partially and in cross-section.

Referring to the drawings wherein like reference characters designate like or corresponding parts throughout different views, and referring particularly to FIGURE 1, the numeral 11 generally designates the radiator cap assembly. It is mounted to a water-cooled radiator housing having a main body portion 14 and a neck portion 16. The neck is provided with a step portion defining an annular floor which, in the preferred embodiment, rests on the margin of an opening 20 in the radiator housing body 14. The neck is vented as at 22 to atmosphere and the terminal or mouth end 24 is rimmed with a depending lip 26 which is notched at diametrically opposed points and the distal end of which is of a varying length from the rim of the mouth to guide a cap into a snug and secure position on the radiator neck by applying torque thereto until it reaches a point of maximum tightness beyond which the caps cannot move by reason of diametrically opposed stop projections on the lip. The assembly 11 includes a cap 32 and a probe combination 34, the said probe combination being receivable through a central opening in the cap 32.

Figure 2:
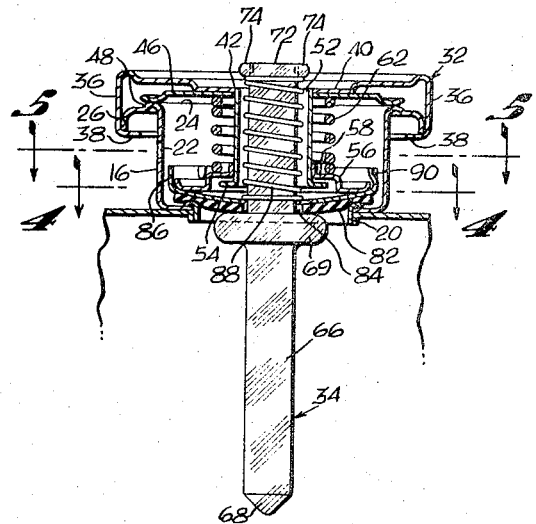
FIGURE 2 is a view in cross-section taken along the plane of the line 2—2 of FIGURE 1 and looking in the direction of the arrow.
Figure 3:
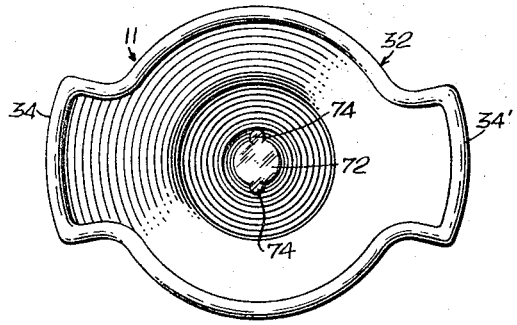
FIGURE 3 is a plan view of the radiator cap shown in FIGURE 1.
Figure 4:
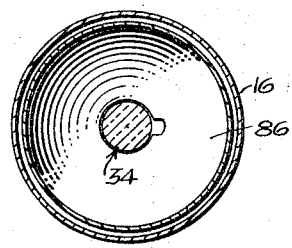
FIGURE 4 is a view in cross-section taken along the plane indicated by the line 4—4 of FIGURE 2 and looking in the direction of the arrows.
Figure 5:
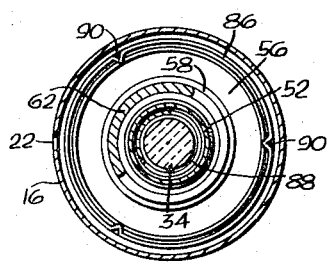
FIGURE 5 is a view in cross-section taken along the plane indicated by the line 5—5 of FIGURE 2 and looking in the direction of the arrows.

Referring first to the cap, it includes a pair of diametrically opposed wings 34 and 36 to receive the application of a torque by the hand and fingers of a mechanic. The cap is sized, as is apparent in FIGURE 2, for positioning over the mouth of the neck, the said cap having depending lips 36 which are provided with distal inwardly directed portions 38 which are, when applying the cap to a radiator initially receivable in the slots and, as the cap is rotated, are drawn tightly into the engagement shown in FIGURE 2 with the lips of the neck of the radiator. The top 40 of the cap is provided with an annular opening 42 and, underlying the main surface of the top of the cap, with a floor 46 which, when the cap is tightly and snugly rotated into position on a radiator housing neck, is drawn into nestling relation with a raised portion 48 so that the circumferential edge of the subfloor is slightly and resiliently displaced upwardly. The sub-floor also carries a sleeve 52 which extends downwardly into the neck of the radiator housing with the terminal end of the sleeve being provided with a foot 54 for a purpose which will become apparent. Over the sleeve a retainer ring 56 is positioned, the said retainer ring having a shoulder 58 which rides on the foot 54 and provides a seat for a spring 62 which is captivated between the sub-floor and the retainer ring to normally urge the retainer ring downwardly. Referring now to the probe assembly, it comprises a shaft 66 of transparent material, preferably Pyrex, which is cone-shaped at its lower end 68 and which is provided, intermediate its length, with an enlarged portion 69 and, at the end 72 with enlarged projections or ears 74. It will be noted that the probe is slidable within the sleeve. An annular gasket 82 having a central opening 84 of a diameter slightly larger than the main diameter of the shaft is seated on the intermediate enlarged portion 69 and in assembly normally urged into that position by means of a cup-shaped gasket plate 86 which in turn is urged downwardly by a spring 88 captivated on the shaft and held in position by the gasket plate and the gears or lugs 74. The gasket plate and the retainer ring are provided with dimples as at 90, to engage one another and hold the probe within the cap.

It is thus seen that pressure on the end 72 of the shaft will cause the enlarged intermediate portion to resiliently move downwardly storing energy in the spring and permitting pressure within the radiator housing to be released by passing through the annular opening of the gasket and into the neck of the radiator so that it may be released through the vent 22. The spring will normally maintain the gasket and the enlarged intermediate portion of the shaft in fluid tight relation and the spring pressure is not large, just sufficient so that it will normally maintain disposition and may be readily compressed on pressure on the end 72 of the shaft to release undesired pressure in the radiator cap when one is preparing to remove it.

It will be seen that the spring 62 is a safety spring and if high pressure builds up in the radiator to an extent at which it is dangerous, the pressure on the underside of the gasket will cause it to move upwardly and compress the spring between the sub-floor and the retainer ring so that the high pressure gasses may excape into the neck and consequently out the vent 22.

The probe being of the transparent material will, when partially immersed in water, cause the appearance of the end 72 of the probe to have an appearance less clear than t would were it not immersed in water and, as a result thereof, the filling station operator can, without removing the cap, determine whether or not there is sufficient water in the radiator. In the event that there is not sufficient water in the radiator and the operator suspects or knows that there is a high pressure in the radiator housing, he may release that pressure by depressing the end 72 and, consequently, moving the intermediate large portion of the shaft away from the gasket, so that the high pressures may be vented through the neck and out the vent 22. To do this he simply need employ a pointed tool such as the end of a pencil or the like. Further, the safety feature of the relatively high compressed spring will insure that the radiator housing will not be subjected to excessive undesired pressures.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An improved automobile radiator cap assembly to indicate the water level of a water cooled radiator housing including a main body, a vented neck having an annular floor defining step and a rimmed mouth with a depending slotted lip; said assembly comprising, a cap having opposed wings for applying torque to the cap and being sized for positioning over the mouth of the lip, said cap having depending lips provided with inwardly directed portions arranged to fit within the slots of the lip of the neck for rotation of the cap into snug overlying relation to the mouth with the lips in tight engagement, said cap having a central opening therethrough, and a shaft supported by the cap to extend through the cap into the radiator housing with a portion of the shaft being visible exteriorly of the cap.

2. An improved radiator cap assembly as set forth in claim 1 wherein the shaft is of transparent material.

3. An improved radiator cap assembly as set forth in claim 2 wherein said shaft is of Pyrex.

4. A radiator cap assembly as set forth in claim 1 wherein said cap is provided with a depending sleeve extending from the cap in circumposed relation to the opening and parallel to the center line of the neck with the distal end of the sleeve being flared outwardly to define feet, a retainer ring in the sleeve and a spring seated on the ring, said ring and spring being captivated on the sleeve, with the spring abutting the cap, and yieldable on pressure on the ring to move axially upwardly toward the cap, said ring being of a diameter sufficient to rest on the annular floor in the neck.

5. An improved radiator cap assembly as set forth in claim 4 wherein said ring and feet carry a gasket to abuttingly engage at least the brink edge of the entrance from the neck into the housing.

6. An improved radiator cap assembly as set forth in claim 5 wherein said shaft is of glass and is slideable in the sleeve, said shaft having an ear at one end, and an intermediate enlarged portion, said gasket being in circomposed relation on said shaft and seated on said intermediate enlarged portion and including an annular gasket plate connecting said gasket to said ring.

7. An improved radiator cap assembly as set forth in claim 6 wherein a second spring is captivated on the shaft between the ear and the plate to normally urge the plate against the gasket and mutually inter-cooperating means are provided to connect the gasket plate and the radiator ring to lock them into engagement so that the shaft is visible in the cap opening, the distance between the visible end of the shaft and the intermediate enlarged portion being such that the gasket is normally seated on the floor of the neck to seal the radiator when the lip of the cap is rotated into snug relation with the lip of the neck and yieldable on compression of the first spring to release fluid into the neck, and said shaft may be depressed compressing said second spring so that the intermediate portions move apart from the gasket and pressure may be released into the neck.

References Cited

UNITED STATES PATENTS 2,164,478   7/1939   Smith _____ 220—24
2,468,833   5/1949   Murphy _____ 146—118

THERON E. CONDON, *Primary Examiner.*

JAMES B. MARBERT, *Assistant Examiner.*